UNITED STATES PATENT OFFICE.

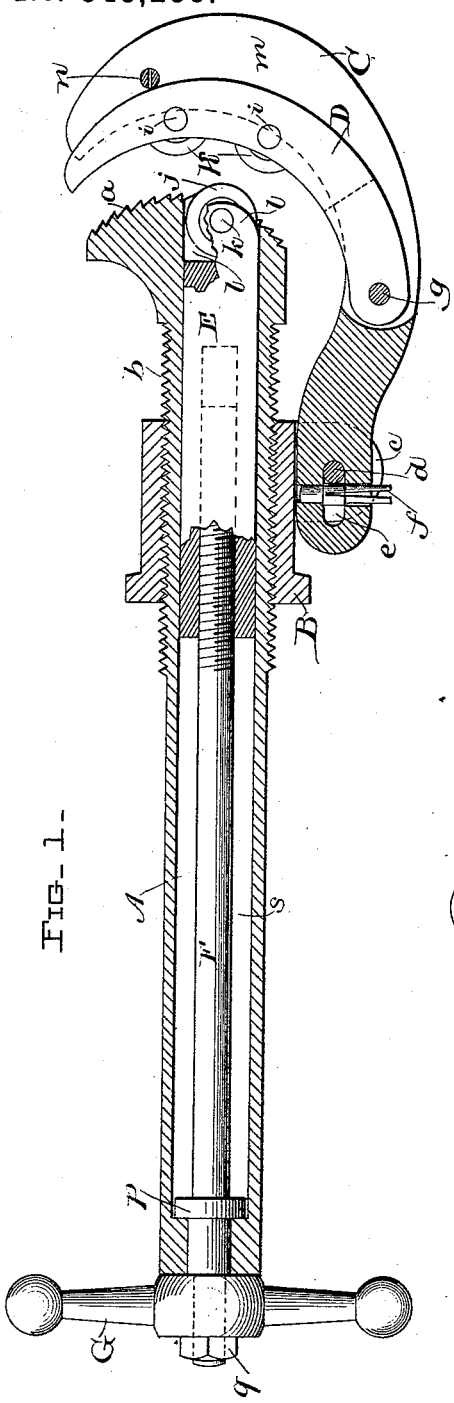

ALBERT H. ESTEN, OF AMESBURY, MASSACHUSETTS.

PIPE-CUTTER.

SPECIFICATION forming part of Letters Patent No. 343,233, dated June 8, 1886.

Application filed February 23, 1886. Serial No. 192,759. (No model.)

*To all whom it may concern:*

Be it known that I, ALBERT H. ESTEN, of Amesbury, in the county of Essex and State of Massachusetts, have invented a new and useful Improvement in a Combined Pipe-Wrench and Cutter, which will, in connection with the accompanying drawings, be hereinafter fully described, and specifically defined in the appended claims.

Figure 1 is a longitudinal section taken as on line Z Z, Fig. 2. Fig. 2 is a plan view of the head portion, taken as from below in Fig. 1. Fig. 3 is a side elevation of the head portion, taken as viewed in Fig. 1.

The object of my invention is to provide a tool that can by a quickly-effected change be converted into either a pipe-wrench or a pipe-cutter, and that will be as convenient and effective when employed for either of these purposes as if it were incapable of a different use; and it consists in the divers devices and combinations thereof, which will be hereinafter pointed out and claimed.

In said views, A represents the cylindrical stock, bar, or body of the tool, the same being formed with the serrated arc-like head $a$ and the screw-threaded portion $b$, on which latter is arranged the correspondingly-threaded sleeve B, formed with ears $c\ c$, between which is pivotally arranged the bifurcated toothed hook C, through the longitudinal slot $e$, in which, and the circular holes in ears $c$ this pivot $d$ passes, and is securely riveted in said ears, while a spring-pin, $f$, inserted in said hook midway of its slot and at right angles thereto may be arranged on either side of pivot $d$, according as it is desired to extend or retract the hook, for purposes to be described.

In the longitudinal central slot, $m$, in hook C, is pivoted at $g$ the minor non-toothed hook D, in which are pivoted at $i\ i$ the cutting-disks K K, said hook D being swung inward toward arc $a$, and secured by spring-pin $n$ when disks K are to be operative, and when not operative said hook D is swung outward to the position indicated by dotted lines in Fig. 3, and is there secured by said pin $n$.

In the larger axial passage $s$ in stock A is arranged to slide freely the bar E, which may be square in cross-section, as shown, or it may be round, and held from rotation by a groove and spline, as preferred.

In the outer forked end of bar E is pivotally mounted the cutter $j$ on its pivot $k$, which passes through ears $l\ l$ of the bar. A bar, F, axially threaded in bar E, and having a step, $p$, and cross-head G, secured by nut $p$, serves as a ready means by which cutter $j$ may be retracted within head $a$, as in Fig. 3, or extended, as in Fig. 1, for co-operation with cutters K K.

When this tool is to be used for cutting pipe, hooks C and D are in the position shown in Figs. 1 and 2, in which case the inner end or shank of hook C bears against sleeve B, and by the sleeve and the pivot-pin $d$ the hook is held in fixed relation to head $a$, thereby enabling cutters $j$ K K to co-operate in severing pipe, the cutter $j'$ being duly advanced by means of rods E F in a well-known manner; but when used as a wrench the hooks are in the position shown in Fig. 3, thus allowing hook C to be vibrated on its pivot $d$ to any desired extent for engaging or disengaging the wrench with or from the pipe.

I claim as my invention—

1. The combination of hollow stock A, formed with serrated head $a$, cutter $j$, pivoted in bar E, arranged in the passage in stock A, and rod F, provided with a handle for rotating it and screw-threaded in bar E, toothed in hook C, cutters K K, mounted in hooks D, pivoted in hook C, and an adjusting-pin, $n$, to secure hook D when adjusted, substantially as specified.

2. The combination, with bar A, having serrated head $a$, and adjustable cutter $j$, of cutters K, pivoted in hook D, supported by hook C, and said latter hook having elongated passage $e$ to receive pivot $d$, and provided with locking-pin $f$, substantially as specified.

3. The combination, with bar A, having head $a$ and cutter $j$, of bifurcated toothed hook C, and hook D, pivoted in hook C, and having cutters K, pivoted therein, substantially as specified.

4. The combination of bar A, formed with serrated head $a$, sleeve B, threaded on bar A, bars E F, threaded together and provided with means for actuating them, cutter $j$, pivoted in rod E, bifurcated and toothed hook C, pivoted in sleeve B, hook D, pivoted in hook C, and cutters K, pivoted in hook D, all substantially as specified.

ALBERT H. ESTEN.

Witnesses:
G. H. BRIGGS,
FRANK R. WHITCHER.